Feb. 17, 1959 — W. D. BACH — 2,873,647
REMOTELY ADJUSTABLE REAR-VIEW MIRROR
Filed Aug. 1, 1956 — 2 Sheets-Sheet 2
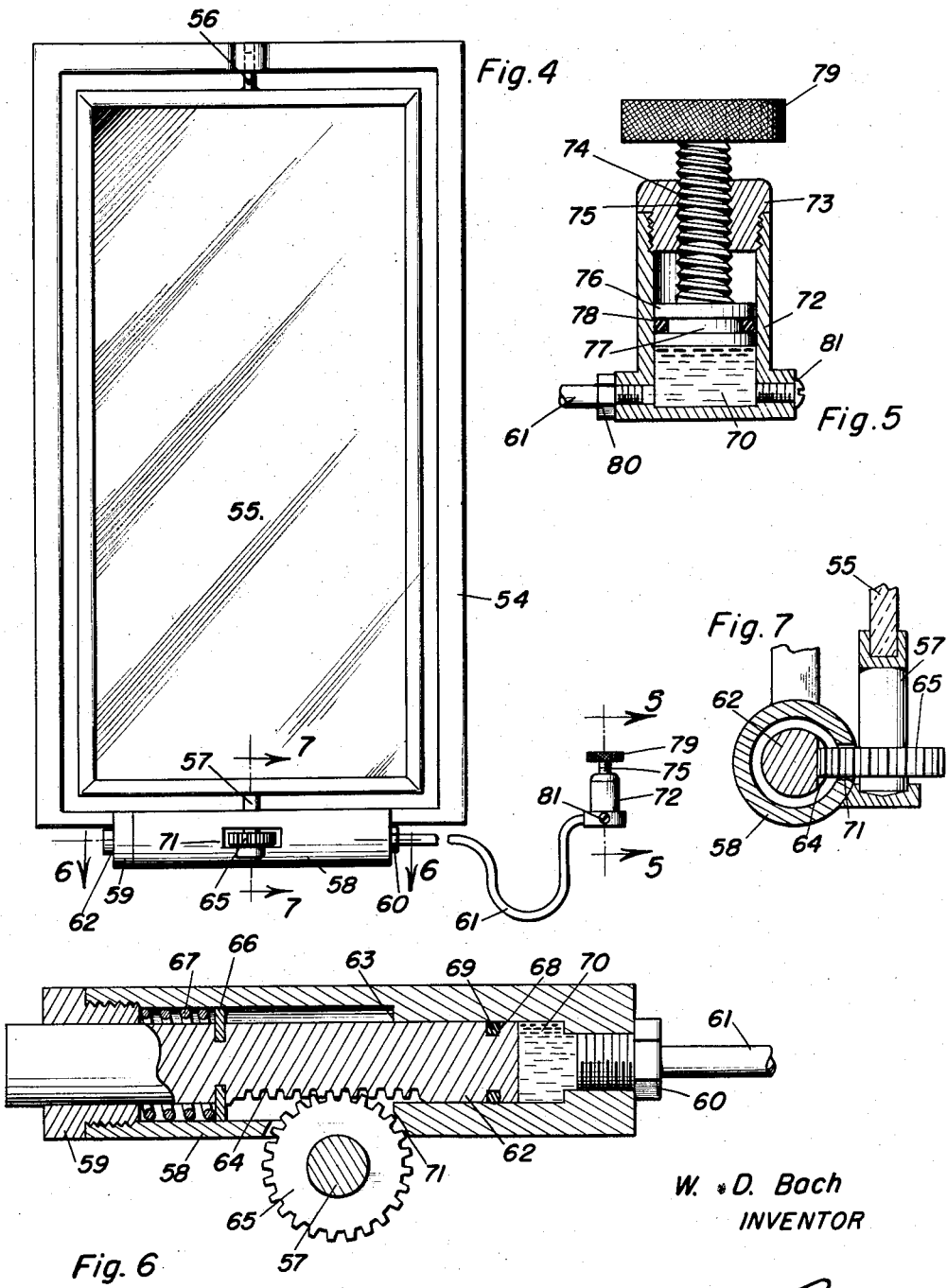
W. D. Bach
INVENTOR
BY [signature]
ATTORNEY

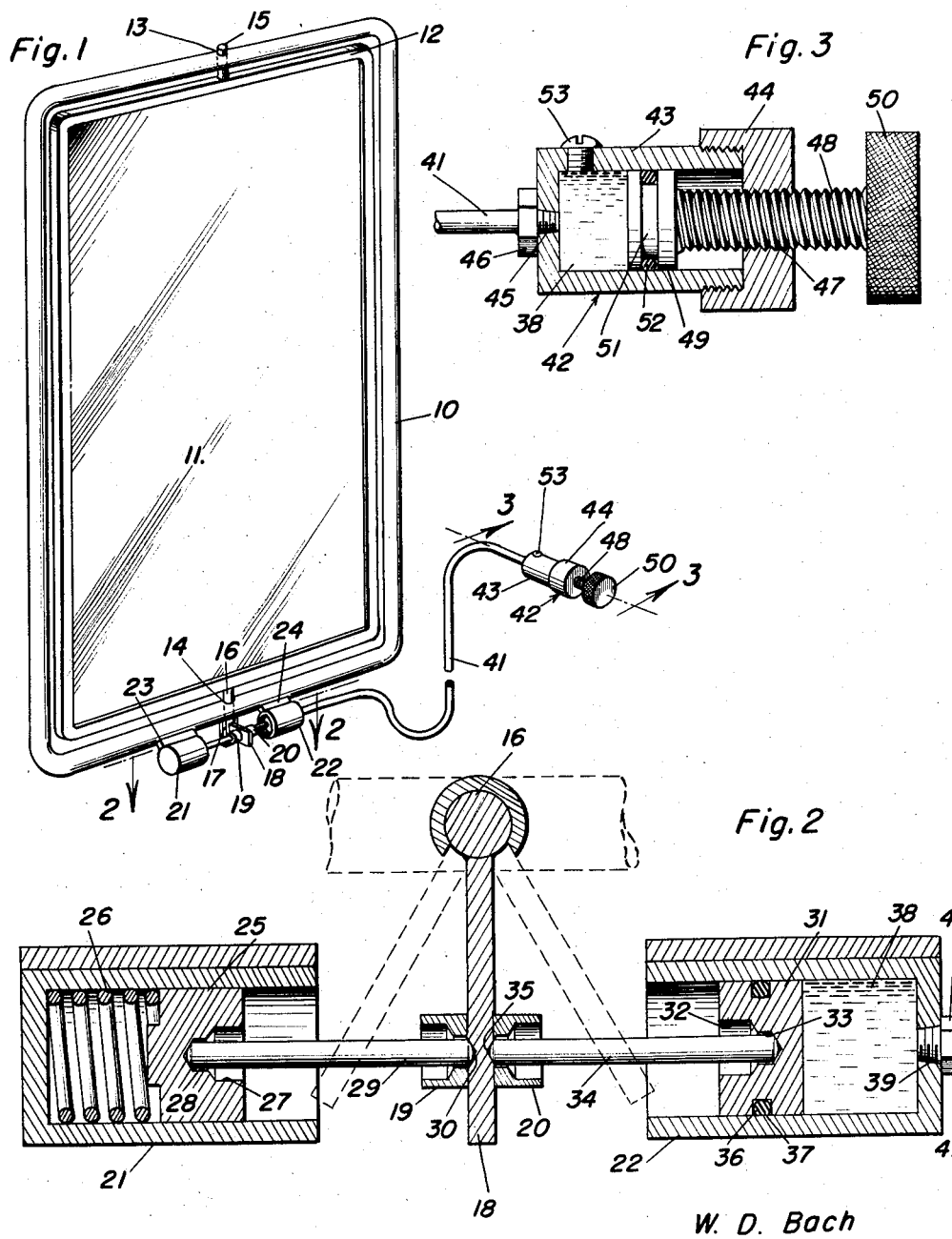

United States Patent Office 2,873,647
Patented Feb. 17, 1959

2,873,647

REMOTELY ADJUSTABLE REAR-VIEW MIRROR

William D. Bach, Montgomery, Ala.

Application August 1, 1956, Serial No. 601,554

7 Claims. (Cl. 88—93)

The present invention relates to accessory devices such as rear-view mirrors, spot-lights or the like which may be mounted on a vehicle or the like and which may be adjusted to various positions from a remote point.

Although the invention contemplates a universal mount for supporting various objects adapted to be oriented such as a display, a rear-view mirror for vehicles and the like, a spotlight for vehicles, boats or the like, it has particular utility in the field of rear-view mirrors for vehicles and will be thus illustrated and described.

In the operation of vehicles, it is customary to provide one or more mirrors directed rearwardly for the assistance of the operator of the vehicle. While such mirrors are often mounted within easy reach of the operator for adjustment purposes, it is usual on large vans or trucks to mount the mirror externally of the body of the vehicle and usually at such a distance from the operator which makes any adjustment of the mirror substantially impossible during the operation of the vehicle. It is well known that it is most difficult to maintain the correct visual angle of such mirrors, and it is therefore the general purpose of this invention to provide a novel mounting assembly for rear-view mirrors in which adjustment of the visual angle of sight can be readily and conveniently made by the operator at all times.

An object of the present invention is to provide a novel rear-view mounting assembly for motor vehicles which includes a frame having a mirror supported in said frame on pivots whereby the mirror may be turned relative to the frame to adjust the angle thereof, and novel remote control means associated with the mount for turning the mirror in its frame.

A specific object of the present invention is to provide such a mount for a rear-view mirror of an automotive vehicle, and means for controlling the same, said means being capable of installation proximate to the operator of the vehicle. This specific object contemplates a novel, simple, inexpensive and practical rear-view mirror mount and means for orienting the same from a control mounted upon the steering column, the dashboard, or any other suitable place near the driver's hand.

A further object of the invention is to provide an adjustable mirror mounting of such nature that the mirror may be mounted at almost any place on the vehicle, and yet be satisfactorily actuated by the remote control device embodied in the present invention.

Other objects and advantages of the present invention will be apparent to those skilled in this art from the following detailed description taken in connection with the accompanying drawings, in which:

Figure 1 is a perspective view of an embodiment of the present invention.

Figure 2 is an enlarged sectional view taken on line 2—2 of Figure 1.

Figure 3 is an enlarged sectional view taken on line 3—3 of Figure 1.

Figure 4 is a front view of a second embodiment of the invention.

Figure 5 is an enlarged sectional view taken on line 5—5 of Figure 4.

Figure 6 is an enlarged sectional view taken on line 6—6 of Figure 4.

Figure 7 is an enlarged sectional view taken on line 7—7 of Figure 4.

Referring to Figures 1, 2 and 3 of the drawings showing one enmbodiment of the invention, the bracket 10 is of generally rectangular configuration and is shown formed of tubular stock although any suitably shaped material may be used. Any suitable means may be provided on the bracket 10 for mounting the bracket on a motor vehicle. The mirror 11 is mounted in a conventional frame 12 provided with shafts 15 and 16 disposed at the midpoint of the mirror and being located one above the other. The bracket 10 is provided with upper and lower bearing openings 13 and 14 to receive the respective shafts 15 and 16. The upper shaft 15 comprises a round rod whereas the lower shaft 16 has a rounded portion passing through the bearing opening 14 and a lower flattened portion 17. A vertically positioned arm 18 is positioned at right angles to the flattened portion and suitably secured thereto. A pair of collars 19 and 20 are welded to each flat face of arm 18 for a purpose that will appear.

A pair of cylinders 21 and 22 are secured to the lower portion of the bracket 10 on opposite sides of the shaft 16. The cylinders are mounted on offset bars 23 and 24 and are angularly disposed with respect to the bracket 10 whereby the cylinders are in line with the collars 19 and 20. The cylinder 21 is a spring loaded cylinder and houses a piston 25 urged inwardly by a compression spring 26. One side of the piston is formed with a large recess 27 terminating in a small recess 28 receiving the end of a rod 29, the other end of the rod extending through the collar 19 and bearing against a recess 30 formed in one face of the arm 18.

The cylinder 22 is a hydraulic cylinder and houses a piston 31 having a large recess 32 and a small recess 33 receiving one end of a rod 34, the other end of which extends through the collar 20 and bears against a recessed portion 35 formed in the opposite face of the arm 18. The piston 31 is provided with a groove 36 to receive a sealing ring 37 to prevent leakage of the hydraulic fluid 38. The rear of the cylinder 32 is provided with an opening 39, threadedly receiving a fitting 40 to which a flexible tube 41 is secured.

The hydraulic pump generally indicated by numeral 42 may be fastened by any suitable means to the inside of the vehicle in proximity to the operator of the vehicle. The pump consists of a cup-shaped cylinder 43 closed at its open end by a threaded cap member 44. The bottom of the cylinder is provided with an opening 45, threadedly receiving a fitting 46 to which the opposite end of the flexible tube 41 is secured. The cap member 44 is provided with a central threaded bore 47 through which a threaded shaft 48 extends. One end of the shaft 48 is connected to a piston 49 and the other end of the shaft carries a knurled operating knob 50. The piston 49 is provided with a groove 51 and a sealing ring 52 to prevent leakage of the fluid 38. A filling opening for the fluid is provided in the upper portion of the cylinder 43 and is closed by a removable threaded plug 53.

The operation of the invention should be clear from the foregoing description. Assuming the mirror 11 to be in the position shown in Figure 1, rotation of the knob 50 in a clockwise direction will force the fluid 38 against the piston 31 and move said piston to the left as viewed in Figure 2, thereby causing rotation of the shaft 16 in a clockwise direction to any desired position. It will be apparent that movement of the piston 31 to the left will cause movement of the piston 25 to the left and cause further compression of the spring 26. When it is desired to adjust the mirror in the opposite direction, rotation of the knob 50 counter-clockwise will enable the spring 26 to force piston 25 to the right thereby rotating 16 in a counter-clockwise direction.

In the form of the invention disclosed in Figures 4 to 7 inclusive, the mirror and bracket are generally similar to the mirror and bracket shown in the first form of the invention. In this second modification, the bracket is indicated by numeral 54, the mirror by numeral 55 and the vertical shafts by numerals 56 and 57. Secured to the lower side of the bracket 54 is a cylinder 58 having threaded bores at each end closed by a plug 59 and a fitting 60. The fitting 60 has attached thereto a flexible tube 61 similar to the tube 41 shown in the first modification. The plug 59 is bored centrally thereof to receive one end of a piston 62. The cylinder 58 has a reduced portion 63 to slidably receive the other end of the piston. Intermediate the ends of the piston 63, a toothed portion 64 is provided to cooperate with the toothed gear 65 rigidly mounted on the shaft 57. Adjacent the protruding end of the piston, a rigid washer 66 is secured to the piston and confines a compression spring 67 between the washer and the plug 59. The other end of the piston is suitably grooved at 68 to receive a sealing ring 69. The fluid is indicated by numeral 70. The wall of the cylinder is suitably slotted at 71 to receive a portion of the toothed gear 65.

The fluid pump shown in Figure 4 compresses a substantially cup-shaped cylinder 72 having its upper end closed by a threaded plug 73. The plug 73 is provided with a threaded bore 74 to receive the threaded shaft 75. The lower end of the shaft carries the piston 76, which is grooved at 77, to receive the sealing ring 78. The upper end of the shaft carries the knurled operating knob 79. The lower portion of the cylinder contains the operating fluid 70 which is forced through an opening receiving the fitting 80. On the opposite side of the cylinder a filling opening closed by a plug 81 is provided.

In this form of the invention, rotation of the knob 79 in a clockwise direction will force the piston 62 to the left as viewed in Figure 6 which in turn rotates the gear 65 causing rotation of the shaft 57 on which mirror 55 is mounted. Rotation of the knob in the opposite direction will cause movement of the piston to the right due to the expansion of the spring 67.

It will be readily apparent from the foregoing description, that the constructions described are well adapted to accomplish the objects and advantages of the present invention. While I have shown two embodiments of my improved rear-view mirror, it will be understood that the same is capable of further modification without departure from the spirit and scope of the invention, as defined in the following claims.

Having thus described the invention, what is claimed is:

1. A rear-view mirror comprising a frame adapted to be mounted in a vehicle, a mirror mounted on the frame in a plane substantially vertical to the line of sight, said mirror being provided with vertically spaced shafts journalled in the frame whereby the mirror may be rotated thereon about an axis containing said shafts, and means for rotating one of said shafts, said means comprising a movable piston mounted adjacent said one shaft, means on said one shaft cooperating with said movable piston to rotate said mirror upon movement of the piston in one direction, compression means for urging said movable piston in a reverse direction for rotating said mirror in a reverse direction, hydraulic fluid for actuating said piston and remote pumping means for urging said fluid against said piston.

2. A rear-view mirror comprising a frame adapted to be mounted on a vehicle, a mirror mounted on the frame in a plane substantially vertical to the line of sight, said mirror being provided with vertically spaced shafts journalled in the frame whereby the mirror may be rotated thereon about an axis containing said shafts, and means for rotating one of said shafts, said means comprising an arm connected to said shaft and extending at right angles thereto, a pair of cylinders supported on the frame on opposite sides of the arm, pistons within each of the cylinders, and selective means for moving each of the pistons toward the arm, and bearing means between each of the pistons and the arm.

3. A rear-view mirror comprising a frame adapted to be mounted on a vehicle, a mirror mounted on the frame in a plane substantially vertical to the line of sight, said mirror being provided with vertically spaced shafts journalled in the frame whereby the mirror may be rotated thereon about an axis containing said shafts, and means for rotating one of said shafts, said means comprising an arm connected to said shaft and extending at right angles thereto, a pair of cylinders supported on the frame on opposite sides of the arm, one of said cylinders having a spring operated piston therein, a bearing between said piston and said arm, said other cylinder having a fluid operated piston, a bearing between said fluid operated piston and said arm, and means for moving said piston towards said arm for rotating said shaft.

4. A rear-view mirror as defined in claim 3, said last mentioned means comprising a pump positioned at a point remote from the mirror.

5. A rear-view mirror comprising a frame adapted to be mounted on a vehicle, a mirror mounted on the frame in a plane substantially vertical to the line of sight, said mirror being provided with vertically spaced shafts journalled in the frame whereby the mirror may be rotated thereon about an axis containing said shafts, and means for rotating one of said shafts, said means comprising a toothed gear mounted on said shaft, a cylinder supported below said frame, a piston in said cylinder having a toothed portion cooperating with said toothed gear and means for reciprocating said piston whereby to rotate said shaft.

6. A rear-view mirror as defined in claim 5, said last mentioned means comprising fluid means on one side of the piston and spring means on the other side of the piston.

7. A rear-view mirror as defined in claim 6, and a remotely positioned pump to supply fluid to the cylinder.

References Cited in the file of this patent

UNITED STATES PATENTS

| | | |
|---|---|---|
| 1,410,587 | Muller | Mar. 28, 1922 |
| 1,931,952 | Charles | Oct. 24, 1933 |
| 2,250,734 | Thompson et al. | July 29, 1941 |
| 2,626,539 | Peterson | Jan. 27, 1953 |
| 2,656,764 | Johnson | Oct. 27, 1953 |
| 2,751,817 | Lapekas | June 26, 1956 |